March 17, 1931.   A. O. AUSTIN   1,796,429
APPARATUS FOR TESTING INSULATORS
Filed Oct. 24, 1927   4 Sheets-Sheet 1
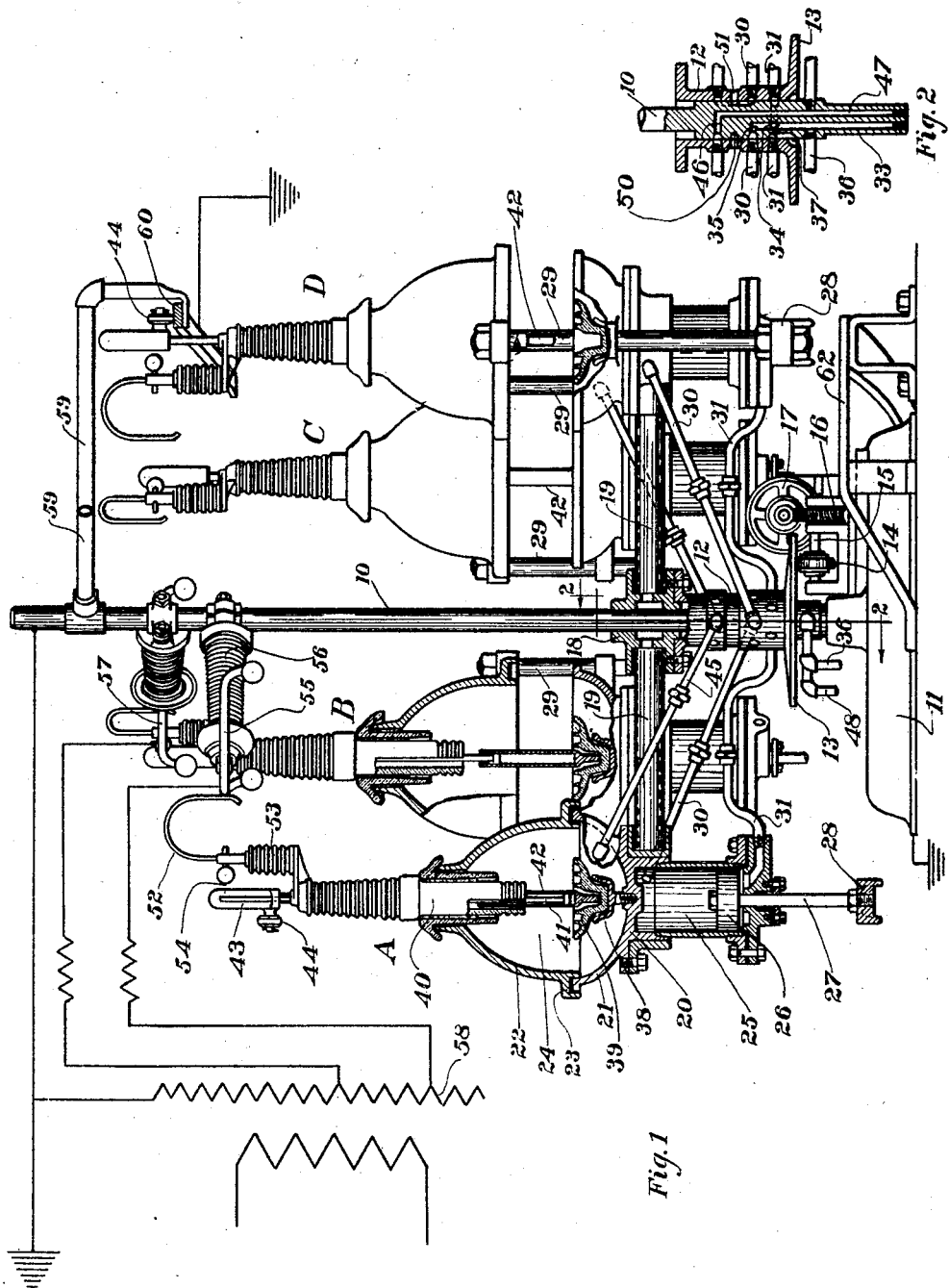
INVENTOR
Arthur O. Austin
BY Nissen & Crane
ATTORNEY

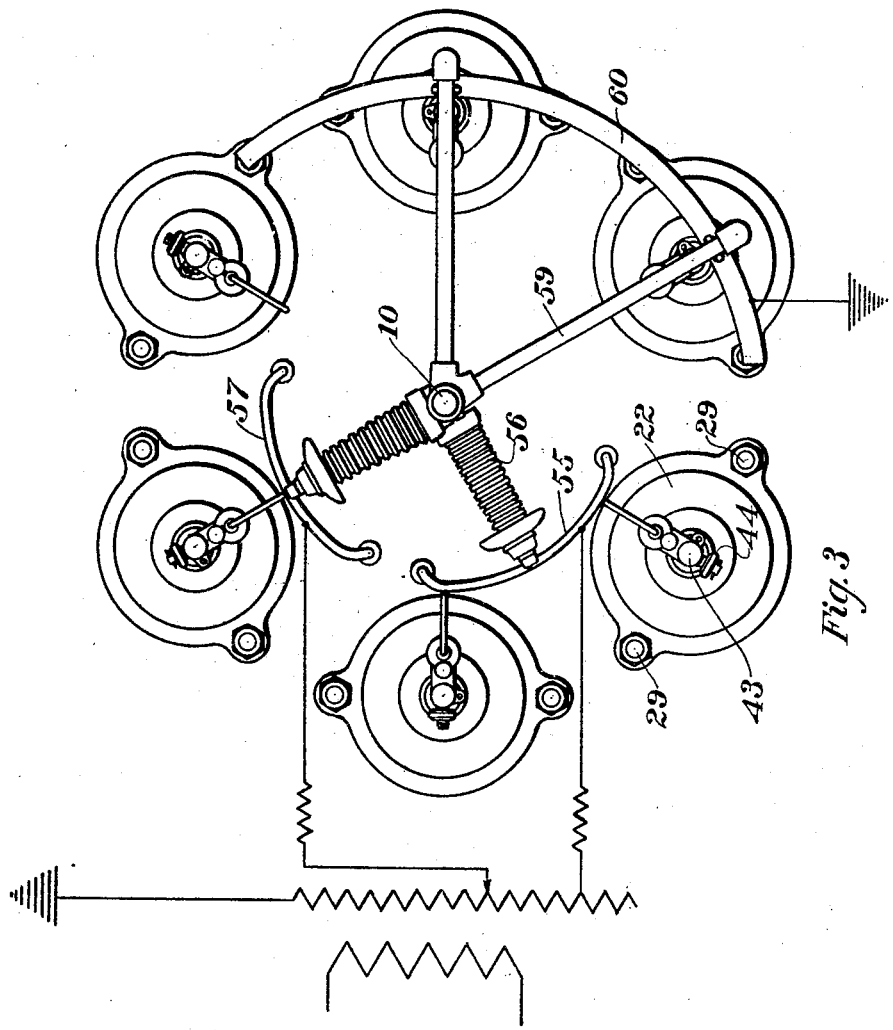

Patented Mar. 17, 1931

1,796,429

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

APPARATUS FOR TESTING INSULATORS

Substitute for application Serial No. 579,137, filed August 2, 1922. This application filed October 24, 1927. Serial No. 228,464.

This invention relates to tests for the dielectric strength of insulators, and has for its object the provision of a method and apparatus by which insulators may be subjected to a voltage greater than the normal flash-over voltage at atmospheric pressure. The process is especially applicable to routine tests and provides continuous operation.

This application is a substitute for application, Serial No. 579,137, filed August 2, 1922.

The invention is exemplified in the combination and arrangement of parts shown in the accompanying drawings and described in the following specification and in the steps of the process therein described, and it is more particularly pointed out in the appended claims.

In the drawings:—

Fig. 1 is a vertical sectional view showing one embodiment of the present invention.

Fig. 2 is a detail section showing a control valve.

Fig. 3 is a diagrammatic top plan view showing one form of electrical circuit for supplying the test voltages.

Fig. 4 is a diagram of a different electrical circuit that may be used.

Figure 5:
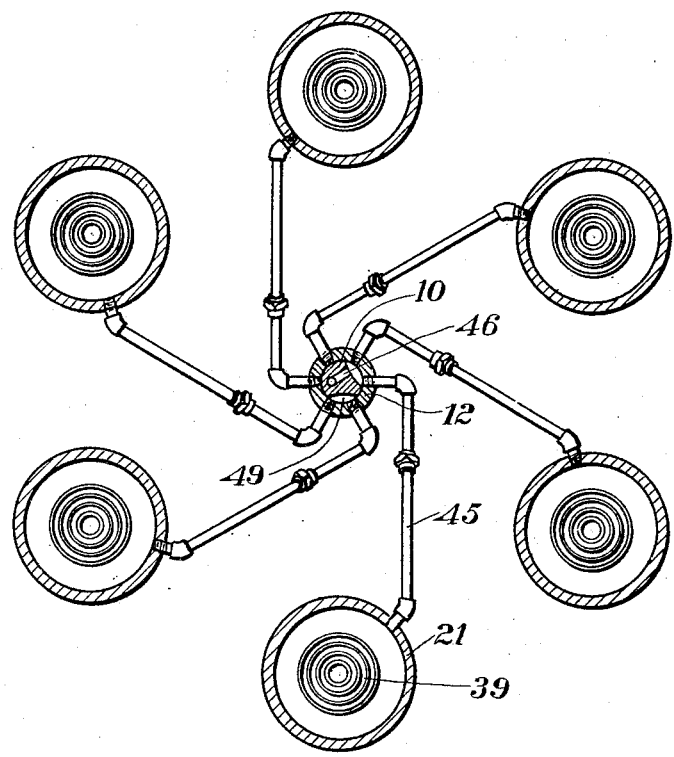
Fig. 5 is a somewhat diagrammatic horizontal sectional view showing the connections for supplying air pressure to the test chambers.

In the form of the invention herein illustrated, a plurality of air tight chambers are mounted on a revolving frame to permit continuous operation. A stationary standard 10 is supported on a base 11 and carries a sleeve 12 journaled to rotate on the standard. A disk 13 is connected with the sleeve 12 and is driven by a friction pulley 14 to rotate the sleeve. The pulley 14 is mounted on a shaft 15 which carries a worm wheel 16 driven by a motor 17. Any other suitable connection may of course be used for rotating the sleeve 12.

Figure 6:
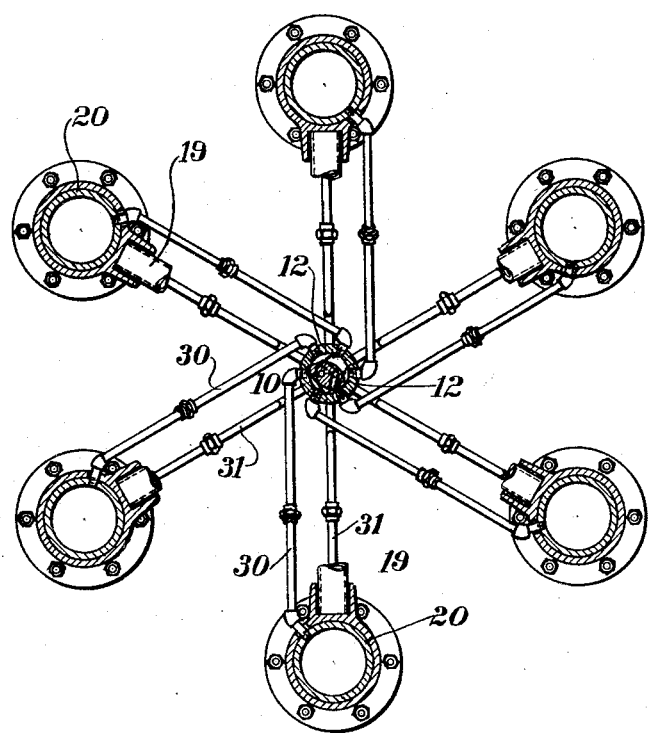
Fig. 6 is a view similar to Fig. 5, but showing the air connections for the operating pistons.

A spider 18 is connected to the upper end of the sleeve 12 and is provided with a plurality of horizontally extending arms 19 which support castings 20 at their outer ends. The upper portions of the members 20 are hemispherical providing cup-shaped bowls or shells 21 open at the top. Inverted shells 22 fit the open sides of the shells 21 and gaskets 23 are provided for forming tight joints between the halves of the casing 24 thus formed. Cylinders 25 are connected with the lower side of the casting 20 and are provided with pistons 26 and piston rods 27 which carry yokes 28 at their lower ends. The upper shell 22 is connected to its yoke 28 through posts 29. The posts 29 are connected at their lower ends to the yokes 28 and at their upper ends to the shells 22. They are guided between their ends by sliding connection with lugs extending from the casting 20. This provides means for raising and lowering the upper shells 22 through the action of the pistons 26. Pipes 30 and 31 connect with the upper and lower ends of the cylinder 25 respectively, the pipes 30 leading to the sleeve 12 at one position on the sleeve, while the pipes 31 connect to the sleeve at a different position, as shown in Fig. 2. A passage 33 within the lower end of the standard 10 communicates with the pipes 30 and 31 at predetermined intervals through ports 34 and 35. A pipe 36 supplies fluid under pressure to the passage 33. The pipes 30 and 31 are so connected at other times with the ports 37 and 51 which lead to atmosphere. The ports for the pipes are controlled by the rotation of the sleeve 12 on the standard 10 which is shaped to form a valve for opening and closing the ports, as shown in Fig. 6. The control of the ports alternately raises and lowers the pistons 26 and the cover shells 22 as will be explained hereinafter.

Supporting cups or brackets 38 are arranged within the housing 24 for receiving insulator members 39 to be tested. Insulator bushings 40 extend through the tops of the shells 22 and are provided with conductors 41 suitably packed to permit sliding movement of the conductors in the bushing 40. Contact terminals 42 are mounted on the lower ends of the conductors 41 and are free to slide thereon. The upper ends of the conductors 41 are provided with weights 43 to normally hold them in their lower positions, each weight having a roller 44 carried thereby for raising it at intervals as will be explained.

Air or gas pressure is supplied to the housing 24 through pipes 45 which communicate through the sleeve 12 with a port 46 and a passage 47 in the standard 10. The passage 47 is connected through a pipe 48 with the source of pressure to be supplied to the testing chamber. The standard 10 is shaped to form a valve as shown in Fig. 5, for controlling the admission of air or gas pressure to the test chambers. The valve also provides a port 49 which connects with atmosphere through openings 51 in the sleeve 12.

Test voltages are supplied to the electrodes 41 through springs 52 mounted on pedestal insulators 53 and communicating with the weighted ends 43 of the electrodes through spark gaps 54. The high potential bus bar 55 is supported by an insulator 56 in position to make contact with the spring 52 during a portion of the rotation of the testing apparatus. A second bus bar 57 may also be provided for contacting with the spring 52 at a different period in the rotation of the apparatus to supply a somewhat lower voltage to the electrodes. These bus bars may both be connected with the same transformer winding 58, as shown in Fig. 1, the leads being tapped from the windings at different points to provide the different voltages. Arms 59 support a cam 60 for engaging the roller 44 to lift the electrode 42 at the time the test chamber passes the operator's position to permit removing the tested insulator and replacing it with one to be tested. Instead of providing two taps at different points on the secondary winding of the transformer, a single tap may be used and a condenser 61 interposed in the circuit between the transformer and the bus bar 57 to reduce the potential to the voltage desired for the bus bar 57.

In the first test position shown at "A" in Fig. 1, the chamber is closed and air pressure has been admitted by the connecting pipe 45. The pressure tending to open the chamber is overcome by the piston pressure being admitted by the pipe 30. This pressure is sufficiently high to not only overcome the pressure inside the chamber, but to maintain a tight joint. In the first test position, contact is made by the spring 52 with the high voltage bus 55 which is energized from the transformer. The voltage causes a spark at the gap 54. The weight 43 is in electrical contact with the electrode 42 which makes contact on one side of the test piece 39. By using a small gap 54, it is possible to tell whether or not the test piece has been punctured. It is evident, however, that this gap may be eliminated, in which case the supporting post 53 is not needed.

By regulating the air pressure inside the chamber, it is possible to place practically any voltage on the test piece desired up to the point of break down of the piece. It is generally desirable to so regulate the air pressure that the test voltage used will be approximately flash-over voltage for the insulator under the conditions of the test or just below flash-over voltage for the pressure supplied.

As the test chambers revolve and the test piece comes into position "B", the chamber is opened by admitting pressure through pipe 31 and relieving pressure above the piston by connecting pipe 30 with atmosphere. The pressure is, of course, relieved from the main chamber 24 before opening so as to avoid danger of spoiling the gasket. In this position, the test piece is subjected to a flash-over voltage by making contact with the bus at 57. The voltage applied by bus 57 is less than that applied by bus 55, but as the insulator is tested at this position in air at atmospheric pressure the lower flash-over makes this necessary. By making this test at flash-over under atmospheric conditions, there is no difficulty in determining whether or not the insulator has been broken down in the first test. While this test is not necessary, it greatly facilitates the speed and accuracy of the test.

When this test is run so as to supply a super-imposed high frequency current on the normal voltage wave, it is particularly valuable in weeding out faults which are under a partial vacuum such as vacuum pockets formed in the material of the insulator during manufacture and which may not be detected in the first test. This test may be supplied by a tap on the same transformer that supplies bus 55 or may be supplied by separate transformers. By connecting the transformers so that the bus 55 and the bus 57 are at the peak of the wave at the same time, it is possible to have the two buses comparatively near together which cuts down the size of the machine. This can be readily accomplished by using the same alternator for both transformers or by mounting the generators supplying the transformer on the same shaft, or by other equivalent means.

As the test chamber revolves into the position "C," it is disconnected from the electrical test. As it revolves still further the electrode 42 is lifted by the small wheel 44 striking the cam 60. As the cam 60 is grounded, there is no danger of shock to the operator. With the electrode lifted, it is possible to remove the test piece 39 and replace same with a new piece to be tested.

A safety cam 62 prevents the yoke 28 from dropping the upper half of the test chamber which might endanger the operator. As the insulators may be tested at a high voltage, a short time only is required to effect a thorough test. The voltage applied should be preferably below the knee of the puncture voltage curve, otherwise, serviceable material may be needlessly destroyed.

Where insulator parts are desired for operation under abnormally severe conditions due to lack of mutual protection, a test of this kind is very effective. The test applies particularly to one piece insulators where it is not possible to obtain a factor of safety by the mutual protection such as bunching several parts or in suspension insulators where a long section length is necessary.

I claim:—

1. Insulator testing apparatus comprising a chamber for containing an insulator to be tested, means for periodically opening and closing said chamber, means for supplying air or gas to said chamber when closed, a terminal member for subjecting an insulator in said chamber to a test potential while said chamber is closed, a supply circuit for said terminal member, and switch mechanism for said supply circuit interconnected with said opening and closing means to regulate the sequence of operation of said switch mechanism and opening and closing means.

2. In combination a plurality of test chambers, means for moving said chambers to bring them periodically into different positions, a terminal member carried by each of said chambers, and automatic means operating in timed relation with the movement of said chambers to periodically connect and disconnect said terminal members with a source of electric potential.

3. In combination a plurality of testing chambers, means for moving said chambers to bring them periodically into different positions, automatic means operating in timed relations with the movement of said chambers to open and close said chambers to permit insertion of insulators therein to be tested, means for supplying air or gas pressure to said chambers when closed and means operating in timed relation with the movement of said chambers for automatically subjecting insulators within said chamber to test potentials while the pressure in said chamber is raised above atmospheric pressure.

4. In combination a test chamber, means for moving said chamber to bring it periodically into different positions, means for opening said chamber at one position thereof to permit insertion of an insulator therein, means for closing said chamber after the insertion of the insulator, means for raising the pressure within said chamber to a point above atmospheric while said chamber is closed, means comprising an electric circuit for subjecting said insulator to a test voltage while under pressure greater than atmospheric, automatic means for making and breaking said circuit, and means for opening said chamber after said circuit has been broken.

5. A test reel comprising a rotary frame, a plurality of test chambers having separable sections mounted on said frame, fluid pressure means for shifting said sections relative to one another to open and close said chambers, and valve mechanism operated by the rotation of said frame for controlling said fluid pressure means.

6. A test reel comprising a rotary frame, a plurality of test chambers mounted on said frame and having relatively moving sections, fluid pressure means for shifting said sections relative to one another to open and close said test chambers, valve mechanism operated by the rotation of said frame for controlling the relative movement of said sections, means for admitting fluid under pressure to said chambers when closed, and valve mechanism operated by the rotation of said frame for controlling the admission of fluid to said chambers.

7. In combination a rotary frame having a plurality of test chambers mounted thereon, fluid pressure means for opening and closing said chambers, means for supplying fluid under pressure to said chambers, and electric circuits for submitting the test pieces within said chambers to electric potential, valves operating in timed relation with the rotation of said frame for controlling the opening and closing of said chambers and the admission of pressure thereto and a switch operated in timed relation with the rotation of said frame for opening and closing said electric circuit.

8. In combination a test frame having a plurality of test chambers mounted thereon, means for moving said frame to bring said chambers periodically into different positions, means operating in timed relation with the movement of said frame for opening and closing said test chambers, means for supplying fluid under pressure to said chambers, means operating in timed relation with the movement of said frame for controlling the supply of fluid to said chambers, said controlling means being timed to admit fluid to said chambers while said chambers are closed, an electric circuit for subjecting test pieces within said chambers to electric potentials, and a switch operating in timed relation with the movement of said frame for closing said circuit to supply test voltage to a piece within a chamber subsequent to the admission of pressure thereto and to open said circuit prior to the release of pressure within said chamber.

9. Insulator testing apparatus comprising means for subjecting an insulator to a test potential while said insulator is under pressure greater than atmospheric pressure, means for subsequently subjecting said insulator to a test potential while said insulator is subject to atmospheric pressure, and means for automatically controlling the sequence of said tests.

10. Insulator testing apparatus comprising a closed chamber, means for raising the fluid pressure within said chamber to a point greater than atmospheric pressure, means for subjecting an insulator within said chamber to a test voltage while the pressure in said chamber is above atmospheric pressure, means for subsequently subjecting said insulator to a lower test voltage at atmospheric pressure, and means for automatically controlling the sequence of said tests.

11. Insulator testing apparatus comprising a chamber, means for raising the pressure in said chamber to a point greater than atmospheric pressure, means for supplying a test voltage to an insulator within said chamber greater than the flashover voltage of said insulator at atmospheric pressure, means for subsequently subjecting said insulator to a lower test voltage at atmospheric pressure, and means for automatically controlling the sequence of said tests.

12. In combination a test chamber, means for moving said chamber to different positions, means for supplying fluid pressure to said chamber while in one position and for subjecting an insulator to a test voltage while the pressure in said chamber is above atmospheric, means for opening said chamber at a different position thereof and for subjecting said insulator to a lower test potential while said chamber is open.

13. Insulator testing apparatus comprising a test chamber, means for moving said chamber in a predetermined path, an electric contact member mounted on said chamber for supplying test voltage to an insulator within said chamber and a stationary contact member adjacent the path of movement of said chamber for engaging said first mentioned contact member at one position of said chamber.

14. Insulator apparatus comprising a movable chamber, an electric contact member mounted on said chamber for supplying test voltage to an insulator within said chamber, a pair of stationary contact members, means for moving said first mentioned contact member successively into engagement with said stationary contact members, and means for supplying different potentials to said stationary contact members.

15. Insulator testing apparatus comprising a chamber having an upper and a lower section, means for moving one of said sections to open said chamber, a contact member for supplying potential to an insulator within said chamber, and means for grounding said contact member when said chamber is open.

16. Insulator testing apparatus comprising a chamber having relatively movable sections, means for moving one of said sections to open said chamber, a contact member for supplying electrical potential to an insulator within said chamber, means for moving said contact member out of operating position when said chamber is open to permit insertion of an insulator within said chamber, and means for grounding said contact member while said chamber is open.

17. In combination a supporting frame having a test chamber thereon, means for moving said frame to shift said chamber into and out of filling position, means for opening said chamber while in filling position, a contact member for supplying electric potential to an insulator within said chamber, means for moving said contact member out of operating position while said chamber is in filling position to permit the insertion of an insulator in said chamber, and means for grounding said contact member while said chamber is in filling position.

18. In combination a movable frame having a test chamber thereon comprising upper and lower sections, means for moving said frame to shift said chamber into and out of filling position, means for raising the upper section of said chamber to open said chamber while in filling position, and a safety device for preventing closing of said chamber while in filling position.

19. An insulator testing apparatus comprising a frame having a test chamber thereon, means for moving said frame to move said chamber into and out of filling position, means for raising a portion of said chamber to open said chamber while in filling position, an electrode for supplying potential to an insulator within said chamber, a cam for raising said electrode while said chamber is open, means for grounding said electrode while said chamber is open and a safety device for preventing said raised portion from falling into closed position while said chamber is in filling position.

In testimony whereof I have signed my name to this specification on this 19th day of Oct., A. D. 1927.

ARTHUR O. AUSTIN.